United States Patent [19]
Borzym

[11] Patent Number: 6,123,003
[45] Date of Patent: *Sep. 26, 2000

[54] AUTOMATIC FEED SYSTEM FOR SUPPORTED SHEAR DEVICE AND METHODS OF OPERATING SAME

[76] Inventor: John J. Borzym, 888 Andover, Northville, Mich. 48167

[ * ] Notice: This patent issued on a continued prosecution application filed under 37 CFR 1.53(d), and is subject to the twenty year patent term provisions of 35 U.S.C. 154(a)(2).

[21] Appl. No.: 08/941,812

[22] Filed: Sep. 30, 1997

[51] Int. Cl.$^7$ .................................................. B23D 21/14
[52] U.S. Cl. ..................................... 83/54; 83/42; 83/189
[58] Field of Search .............................. 83/42, 54, 183, 83/196, 189, 401, 178–182, 184–188, 190–195

[56] References Cited

U.S. PATENT DOCUMENTS

| | | | |
|---|---|---|---|
| 2,397,048 | 3/1946 | Roop | 83/189 |
| 2,404,901 | 7/1946 | Cibs | 83/189 |
| 4,631,998 | 12/1986 | Borzym | 83/145 |
| 4,635,514 | 1/1987 | Borzym | 83/196 |
| 4,744,277 | 5/1988 | Balint | 83/54 |
| 4,787,281 | 11/1988 | Gardner | 83/42 X |
| 5,299,480 | 4/1994 | Harris et al. | 83/42 X |
| 5,406,870 | 4/1995 | Suitts et al. | 83/54 X |

FOREIGN PATENT DOCUMENTS 328258  10/1920  Germany .................................. 83/189

OTHER PUBLICATIONS

Article "The Basics of Supported Shear Cutting", Tube & Pipe Quarterly, vol. 7, No. 2, Mar./Apr. 1996, pp. 28–30.

*Primary Examiner*—Kenneth E. Peterson
*Attorney, Agent, or Firm*—Young & Basile, P.C.

[57] ABSTRACT

An automatic tube shearing system of the type requiring no shearing blades comprising an automatic two-stage tube feed mechanism and a bladeless shear. The feed mechanism comprises a tube loader, a pinch roller type initial drive, a selectively engageable main roller drive and an intermittent drive including a gripper which operates in a precision fashion to feed tube through the shear apparatus. The shear apparatus is of the type requiring tooling, both externally and internally of the tubing to prevent deformation during the bladeless shear operation. The internal tooling comprises a mandrel having a position stabilization rod extending along the tube end feed path and equipped with a pair of spaced apart latches which operate in a complemental fashion to permit tube lengths to be fed onto the mandrel rod and later fed through the shear without ever unlocking the stabilization rod and losing the proper positioning of the mandrel. A unique tube clamp and several methods of using the apparatus to provide substantially continuous tube feed are disclosed.

7 Claims, 4 Drawing Sheets

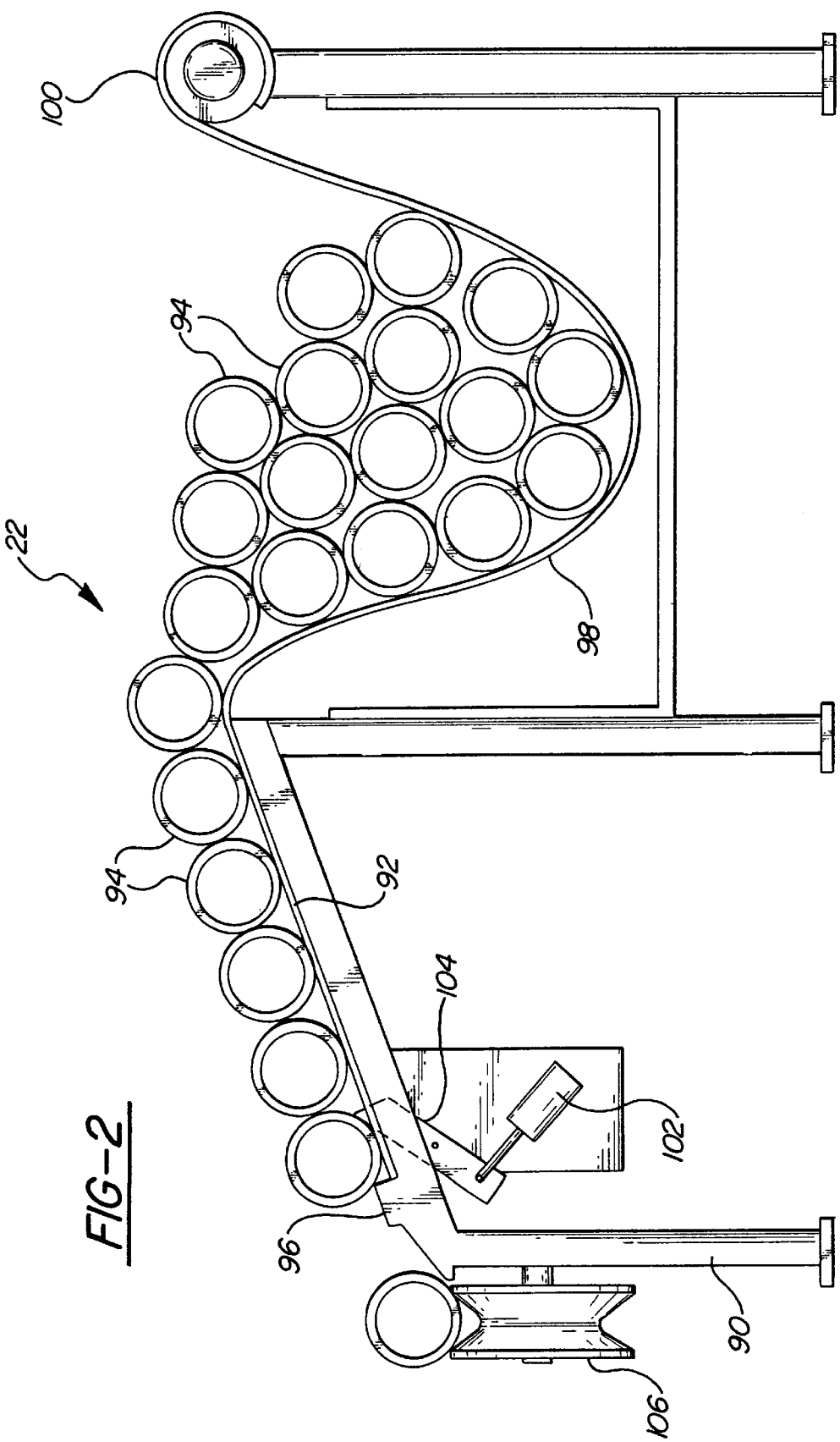

AUTOMATIC FEED SYSTEM FOR SUPPORTED SHEAR DEVICE AND METHODS OF OPERATING SAME

RELATED APPLICATION

This application is related to co-pending application for U.S. patent "Supported Shear," attorney's Docket No. TMA-005, filed concurrently herewith in the names of John J. Borzym and Alexander Borzym as co-inventors. The disclosure of that application is incorporated herein by reference.

INTRODUCTION

This patent application discloses an automatic system for feeding workpieces such as long lengths of tubular steel stock into a supported shear apparatus of the type requiring an internal mandrel to support the stock in the area of the shear plane during the shearing operation. It also describes components of such a system and one or more methods of operating the system to repeatedly shear lengths of tubular stock into shorter lengths in an essentially continuous, uni-directional manner.

BACKGROUND OF THE INVENTIONS

Tubular stock is used as a basic raw material in the manufacture of innumerable products including automotive exhaust systems, automotive structural and drive line components, furniture, bicycles, fencing, and conduit for electrical lines, fluids and gases. Metal tubes are commonly produced by a cold-forming process wherein flat stock is removed from skegs, progressively roll-formed to a near tubular shape and closed to form the tube by heating the opposite exposed edges of the partially formed stock and forging them together. Alternatively, tubular stock can be formed by a hot extrusion process.

Once formed, the tubular stock must be cut into manageable lengths. Typically, this takes place on-line with the production of the tubing through the use of an apparatus which is capable of moving in synchronism with the tubing and cutting it on the fly. Such devices include saws and guillotines using hardened steel blades.

The lengths of tubes which are cut in the primary process described above are typically fairly long; i.e., 20 feet or more in length. These lengths are often subsequently re-cut into shorter lengths for final fabrication. Re-cut devices fall into two categories: (1) saws and guillotines which drive a blade through the stock and (2) supported shears in which part of the tooling is internal of the workpiece during the shear operation. Within the tube shearing technology, the automatic feed apparatus described herein and the methods of operating same apply exclusively to supported shears; however, the feed apparatus and methods may be applicable to any workpiece treatment mechanism involving passage of the workpiece over a mandrel; e.g., a tube bender. In addition, certain of the components described herein are suitable for numerous applications outside of the supported shear technology.

Supported shear devices typically involve first and second dies which are disposed immediately adjacent one another along the longitudinal path which the tubular workpiece follows as it passes through the shear dies and which are movable under power relative to one another along an interface which defines the shear plane. Proper shearing action requires that the workpiece be supported internally by a mandrel in the area of the shear plane. A short but valuable description of the supported shear process may be found in the *Tube and Pipe Quarterly,* Volume 7, No. 2, March/April 1996, "The Basics of Supported Shear Cutting," pages 28–30.

A substantial advance in supported shear devices was made by Alexander Borzym in the 1980's and is recorded in U.S. Pat. No. 4,635,514 issued Jan. 13, 1987. In that device one of the two adjacent dies is caused to reversibly move relative to the other through an orbital or elliptical path by a specially designed drive system. Mr. Borzym's invention was an improvement over the prior art devices in which the relative die movement is in an L-shaped path.

While the supported shear is typically used as a re-cut device, it is advantageous to provide the capability for automatically feeding the master lengths of tubing into the shear device. This function is complicated by the presence of a feed stop and by the mandrel and the support rod by which the mandrel is held in place within the shear plane.

Prior art devices have supported the mandrel within the shear plane on a rod which extends away from the shear device in the exit direction such that the cut lengths of tubing accumulate on the mandrel rod. These cut lengths must periodically be removed by reverse feed or by periodically withdrawing the mandrel rod. See also U.S. Pat. No. 4,631,998 in which both the mandrel and the rod are periodically withdrawn to remove cut tube lengths.

SUMMARY OF THE INVENTION

It is one of my objectives to create a system for automatically feeding tubular stock into a supported shear or other treatment facility with production efficiency and speed which has not been realized by prior art devices, which does not require withdrawal or movement of the mandrel or mandrel support rod, which permits the mandrel rod to extend along and toward the entry side of the shear device and which permits uni-directional flow of stock through the shear device and a total elimination of length restrictions on the treated tube.

It is my further objective to achieve a high degree of precision and length control, to reduce scrap to mathematically minimum levels, and to afford flexibility and variety in the manner and mode in which a supported shear device is operated.

In general, I achieve my objectives through an apparatus or system which is preferably combined with a supported shear of the orbital movement type wherein the mandrel or internal tooling is precisely maintained in the correct position by a latched support rod of considerable length; i.e., longer than the longest lengths of tubing to be fed onto the rod. The rod extends away from the shear in the input direction and is held in place by first and second spaced latches which are inter-dependently operable so that at least one of the latches is closed to hold the mandrel rod in the proper position at all times.

In the preferred form, my apparatus or system comprises two sequential feed systems; one feed system being operative to rapidly move lengths of tubular stock uni-directionally over and onto the mandrel support rod at a high rate of travel and to bring each piece of tubular stock into a staging area or position. At this time a second feed system takes control of the stock to incrementally feed it through the shear device to create the desired lengths. Because both of these feed systems operate to feed tube in the same direction, a second and subsequent length of tubular stock may be fed into the apparatus before the shearing process of the previous length has been completed.

The invention also lies in several of the components of the apparatus and/or system disclosed herein including a selectively engageable roller-type variable speed uni-directional main drive. In the system, I place this drive between the two relatively widely spaced mandrel support rod latches so as to feed lengths of tubular stock to a second, more downstream incremental feed device.

Another component of the apparatus disclosed herein is a novel gripper device wherein gripper are caused by eccentrically rotated actuators to positively close and open, to clamp and unclamp the tube. Although advantageously used in the automatic feed system described herein, the gripper device is also capable of many other applications.

Still another inventive component described herein is a mandrel rod support scheme which is also disclosed in the co-pending application identified above. That system comprises the use of a plurality of streamlined forms disposed along the mandrel rod at, for example, four foot intervals, to maintain the mandrel rod precisely at the center of the tubing as it passes over the forms and to prevent sagging of the mandrel rod and mislocation of the mandrel relative to the shear plane. This scheme requires a support table which is fixed relative to the mandrel support latches so that the table directly supports the tubing and indirectly supports the mandrel rod by way of the tubing and the mandrel rod forms.

Another invention disclosed herein is the use of a novel cleaning brush which is disposed on the mandrel rod to clean steel tubing as it is fed onto the mandrel rod.

A first method aspect of my invention involves a compound feed sequence including a first step of advancing tubular stock onto and over a mandrel rod from an in-feed position to the shear plane for the purpose of establishing a position reference and thereafter incrementally advancing tubular stock through the shear plane while maintaining the position reference.

Another method aspect of my invention involves the essentially unidirectional feeding of tubes into and through the shear apparatus in sequence, wherein the second and subsequent tubes which are fed onto the mandrel rod and into the incremental feed area are used to clear the tail stock of a previous tube through the shear thereby to clear the shear apparatus in preparation for the receipt of the second and subsequent tubes.

My invention as well as the various detailed apparatus aspects and the method aspects thereof may be best understood and appreciated from a reading of the following specification which describes an overall system as well as detailed components of the system and methods of operation thereof.

BRIEF DESCRIPTION OF THE DRAWING

FIG. 2 is a perspective drawing of a tube descrambler/loader apparatus usable in combination with my invention;

DETAILED DESCRIPTION OF THE INVENTIONS

Figure 1:
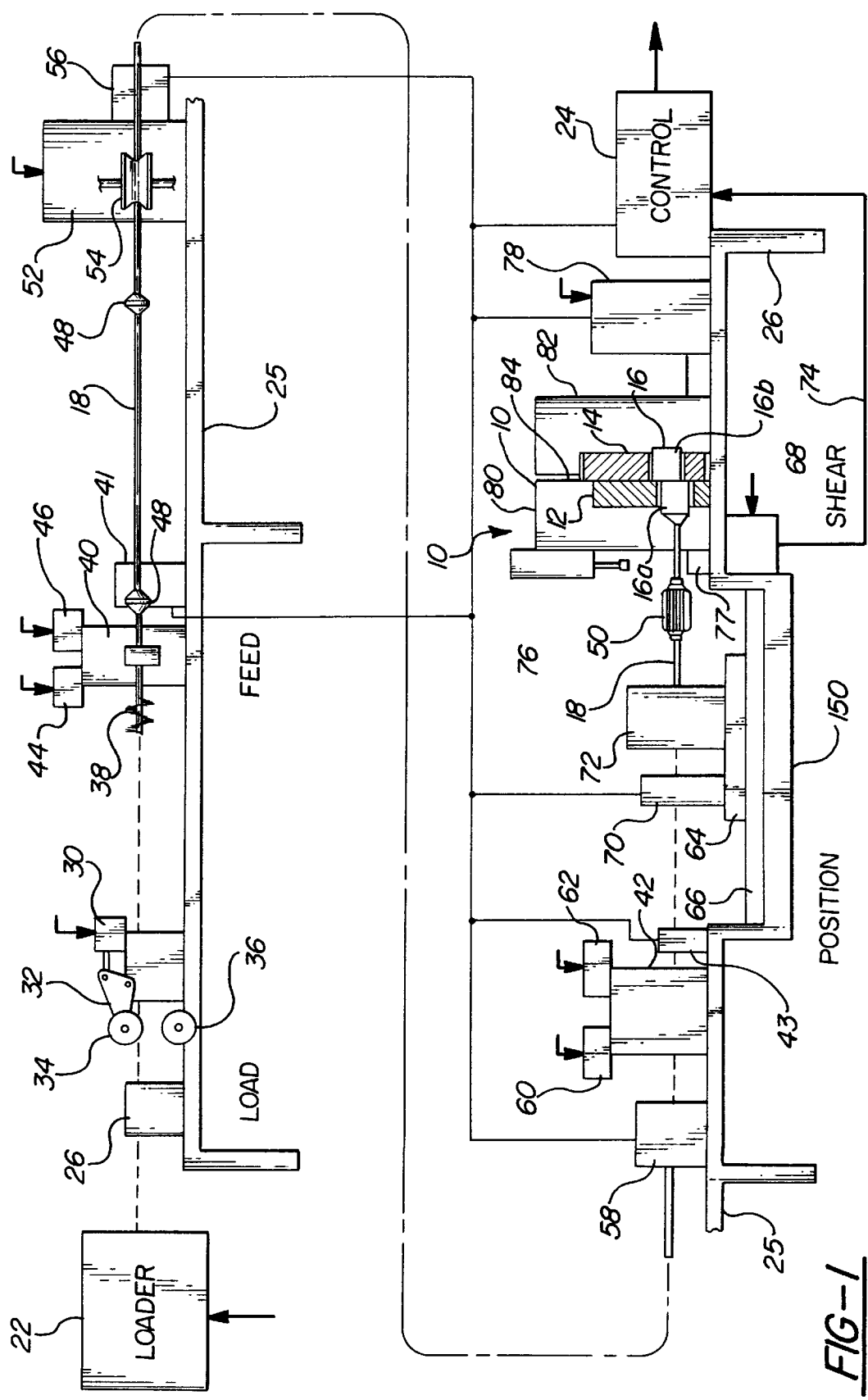
FIG. 1 is a schematic diagram of an overall automatic feed and shear system incorporating the apparatus aspects of my invention and being operable in accordance with the method aspects of my invention.

Referring first to FIG. 1, I illustrate schematically the components and the layout of a system for automatically feeding twenty foot lengths of welded steel tubing through a bladeless shear apparatus 10 of the type having external tooling 12, 14 and an internal mandrel 16 mounted on a mandrel support rod 18 which extends from the shear 10 back along a tube feed path 20 a distance of approximately 30 feet. It will be understood that the dimensions, distances, capacities, feed rates and other numerical data given in this specification, unless otherwise indicated, are for purposes of illustration and are not to be construed in a limiting sense. The system shown in FIG. 1 is schematically divided linearly into four sections which are denominated "LOAD," "FEED," "POSITION," and "SHEAR," respectively. Flow of tubular stock through the system is from the LOAD section to the SHEAR section.

A loader 22, shown in greater detail in FIG. 2, is adapted to receive and accumulate a dozen or more lengths of tubular stock in a strap sling or cradle which is manipulable to feed tubular stock onto a ramp which is belt driven to cause the tubes to roll up against a fixed mechanical stop where they are held until a signal is received from a controller 24. The controller 24 is a state-of-the-art industrial controller of the type which includes a programmable microprocessor and storage for applications software to carry out the methods described herein. The controller essentially responds to specific input signals to enable specific outputs as will be apparent to skilled artisans. The controller output causes the loader to lift individual lengths of tubular stock over the mechanical stop and drop the lengths, one at a time, onto a series of spaced high speed drive rollers which advance the tube toward a support table 25 which underlies essentially all of the hereinafter described apparatus including the shear 10 and which is essentially coextensive with the tube feed path 20. The loader 22, although described in somewhat greater detail with reference to FIG. 2, is essentially a known device usable in combination with virtually any type of tube re-cut machine as will be apparent to those knowledgeable in and with the tube fabrication technologies. The support table 25, although shown as a single, integral device, may be created by the assembly of several fabricated devices such as weldments or other structures. Support 25 may also include a direct tube support device of the type disclosed in copending application TMA-005.

Tubular stock advanced toward and into the tube feed path 20 by the loader 22 encounters a photocell 26 which is so located as to produce a signal, one state representing the presence of a tube and the other state representing the absence of a tube. In the typical operation method, a look-up table in the controller 24 responds to the input to generate an output activating the in-feed drive cylinder 30 to rotate a link 32 thus causing a roller 36 to engage the outer surface of the tube and advance it toward the entry end of the mandrel rod 18. Drive roller 36 works in conjunction with selectively operated pinch roller 34.

A spiral wire bristle brush 38 is removably secured on and to the entry end of the mandrel rod 18 to clean the internal diameter of the advancing tubular stock. Just downstream of the brush 18 is a mandrel lock 40, the first of two essentially identical mandrel locks 40, 42 spaced linearly apart in the system of FIG. 1 by a distance which is greater than the maximum length of tubular stock to be accommodated. Mandrel lock 40 comprises two controller activated power cylinders 44 and 46 which are operated in sequence for purposes to be described to latch and release the mandrel rod 18. As will hereinafter be made apparent, the controller 24 issues commands to the mandrel locks 40 and 42 in such a way that one of the two locks is operative to latch the mandrel rod and maintain its axial, longitudinal position with great precision at all times.

The mandrel rod 18 has installed thereon, in addition to the spiral de-burring brush 38, a number of spaced steel forms 48 and 50 the outer diameters of which approximate the inner diameter of the tubing. These forms 48, 50 operate in combination with an infeed support table of the type described in co-pending application Attorney's Docket No. TMA-005 to support the mandrel rod 18 and prevent it from sagging so as to mislocate the mandrel relative to the shear plane. The first form 48 is essentially the same diameter as the body 50 and is, therefore, a "qualifying" form for effectively rejecting undersized tube. Subsequent forms 50 may be slightly smaller in diameter. The form 50 is shown in greater detail in Figures and 7 to be of greater length and of an overall design which is somewhat different than the forms 48 because it is located in the area where successive tubes which are simultaneously in the system of FIG. 1 abut one another during certain operations hereinafter described.

Figure 4:
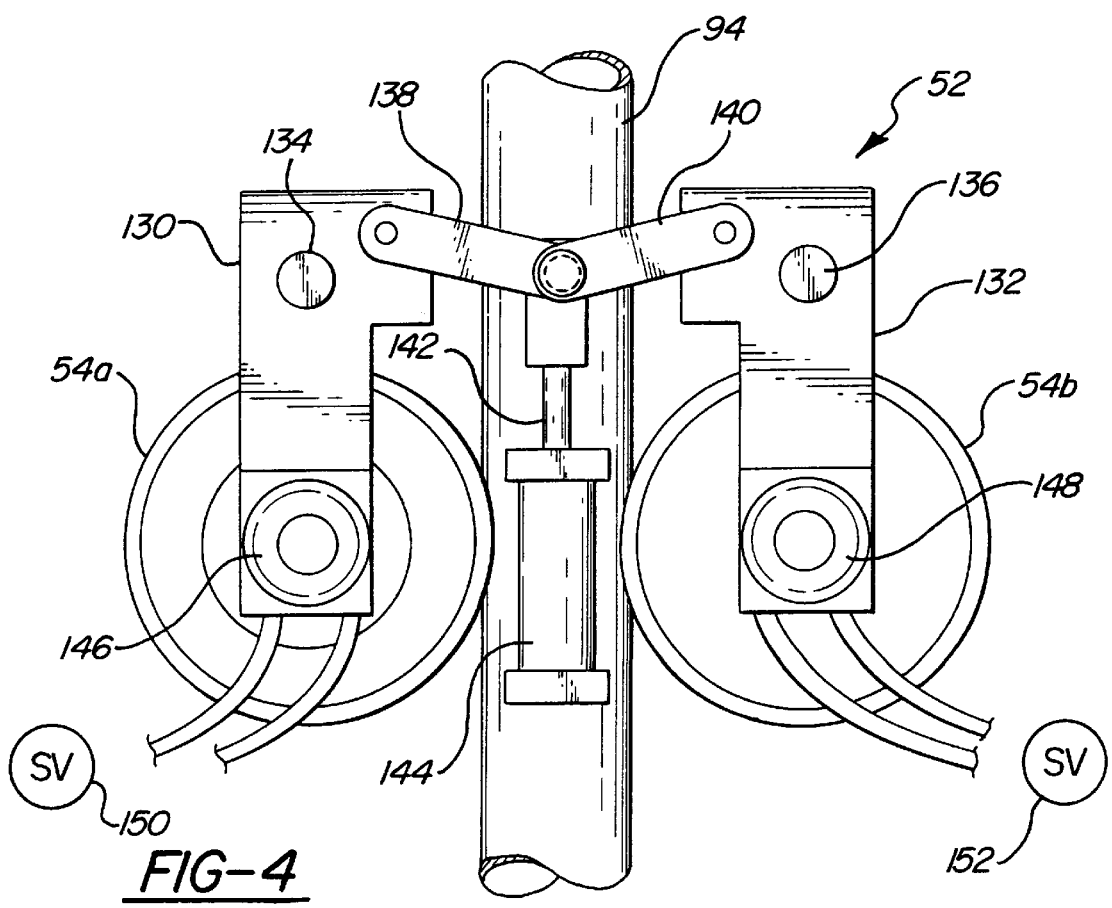
FIG. 4 is a detail of the main drive in the "feed" portion of the system of my invention.

Downstream of the mandrel lock 40 is the main roller drive mechanism 52 comprising a pair of selectively outwardly movable pinch rollers 54 which operate under the control of the controller 24 to engage and disengage lengths of tubular stock and feed them unidirectionally but at selected and different speeds toward the shear 10. Details of the main roller drive mechanism 52 are illustrated in FIG. 4. Downstream of the main drive 52 is a limit switch 56 which is of a conventional type to be engaged by advancing tubular stock to produce an electrical signal of binary character which is connected via bus 28 to an input of the controller 24. Additional limit switches 41 and 43 are located on support 25 just downstream of the mandrel locks 40 and 42 respectively. These switches signal the controller 24 that the trailing tube end has cleared the mandrel.

Also disposed on the support 25 and downstream of the main roller drive 52 is an additional limit switch 58 producing an output signal which is connected to an input of the controller 24. Just downstream of limit switch 58 is the second mandrel lock 42. Mandrel lock 42 comprises sequentially activated cylinders 60 and 62 which receive commands from the controller 24 according to a program of operations hereinafter described. Arrival of the entry end of a tube at switch 56 signals the controller 24 to start a high speed advance for a pre-set time calculated (on the basis of known tube length) to bring the lead end of the tube near switch 58. The drive reverts to a low speed drive at this point. Movement forward from switch 58 is also timed to bring the lead end right up to lock 42.

Limit switch 58 and mandrel lock 42 are in the "FEED" or staging portion of the system. The "POSITION" portion of the system includes an aluminum platform type carriage 64 which is mounted on a pair of parallel spaced apart precision steel rails 66 mounted on a level bed 150 for incremental and bi-directional movement under the control of a ball screw type AC motor carriage drive 68 the input commands to which are received from the controller 24 in a known fashion. Mounted on carriage 64 is a limit switch 70 the function of which is to produce a signal to the controller 24 which indicates the high speed approach of the lead end of a length of tubular stock into the "POSITION" portion of the system. This signal operates, according to a program stored in the microprocessor memory of the controller 24, to reduce the operating speed of the main drive 52 such that the tube advances toward a reference position for purposes hereinafter described at a substantially lower rate of travel.

Just downstream of the limit switch 70 along the tube feed path 20 is a precision gripper/feeder 72 hereinafter referred to simply as the precision feed 72. The gripper portion of the precision feed 72 is illustrated in more detail in FIG. 5 to include components which are capable of gripping and holding a length of tubular stock with sufficient force and with such little slip as to ensure that the position of the carriage 64, once a position reference has been established, is an accurate representation of the position of the tubular stock relative to the shear plane defined by and in the shear apparatus 10. As shown in FIG. 1, a conventional feedback signal is fed by way of line 74 from the reversible carriage drive 68 to the controller 24 such that the controller 24 is aware of; i.e., has data indicating the position of the carriage 64 along the rails 66 relative to the position reference at all times. The rollers 54 of the main drive 52, on the other hand, permit slip so as to prevent damage to the system components and/or the tubular stock in the event of minor collisions and to allow the high and low speed advances of the tubing by the main drive rollers 54 to be conducted on a timed basis rather than on the basis of precision position control as is the case for the carriage mounted components 70, 72 in the system of FIG. 1. Position feedback information from the "FEED" system to the controller 24 comes from the limit switches 41, 43 and 56.

By way of further explanation, it will be apparent to those skilled in the electronics and position control art that the limit switch typically detects and signals only the presence or absence of a physical article at a given position at any given time. On the other hand, a AC motor driven ball screw position drive such as that used at 68 to control the position of the carriage 66 can be combined with very high resolution signal transducers such as digital shaft angle encoders to provide data on the absolute position of a physical object within a known path of permissible travel at any given time.

An hydraulic clamp 76 is mechanically mounted on the frame of the shear 10 over the tube feed path 20 in the vicinity of the form 50 to clamp tubular stock to maintain the position reference; i.e., the positional relationship between the tubular stock and the shear plane, whenever the precision feed 72 releases the tube and moves in the reverse direction; i.e., to the left as shown in FIG. 1, to start another incremental advance toward the shear 10. The clamp 76 is otherwise released to permit tubing to be fed into and through the shear 10. Clamp 76 operates against a tube seat 77.

Details of the shear 10, the associated external tooling 12, 14 and the internal mandrel 16 can be obtained from a reading of the aforementioned U.S. Pat. No. 4,635,514 and from the co-pending application TMA-005 simultaneously filed with this application. However, for purposes of achieving an immediate fundamental understanding of the physical character and operation of the shear and its associated tooling, the following information is offered.

The shear 10 comprises a first heavy steel ram 80 which, during the shearing operation, is fixed to a reference frame or base which is coextensive with the support 24 as shown in FIG. 1. Ram portion 80 carries hardened steel ring tool 12 having a throughbore of a diameter which accepts in close contact relationship the outside surface of the tubular workpiece to be severed to length. An internal clearance of 0.012" or less is preferred. A second movable ram 82 is disposed in adjacent relationship with the first ram 80, the interface between the tools 12 and 14 defining a shear plane 84. Ram 82 carries hardened steel tool 14 which abuts tool 12 along the shear plane 84. Tool 14 is also formed with a circular aperture conforming essentially to the outside diameter of the tubing to be operated upon. Whereas ram 80 and tool 12 are stationary, ram 82 and insert 14 are laterally displaceable through an orbital path illustrated in FIG. 1 under the control of a powerful bi-directional drive 78 the details of which are fully described in the co-pending application TMA-005 having the same filing date as this application, the disclosure of which is incorporated herein by reference. The relative displacement between the tools 12 and 14 is approximately equal to the wall thickness of the tubular stock and, in combination with the internal forces which are created by the mandrel 16, is operative to shear the tubular stock along the shear plane in a clean, minimally distorting and slugless fashion. The mandrel 16, as illustrated in FIG. 1, must be designed and constructed in such a fashion as to permit longitudinally adjacent portions 16a and 16b to displace radially of one another nearly to the same extent as the inserts 12 and 14 displace radially relative to one another. It can be seen and appreciated in FIG. 1 that the interface plane between the internal tooling components 16a and 16b should be precisely coextensive with the shear plane 84 at all times as any other relationship produces an inferior cut quality. This is why the mandrel 16 is associated with the stabilization rod 18 and why one or both of the mandrel locks 40 and 42 must be activated to hold the position of the rod 18 and the mandrel 16 at all times during operation of the shear 10. Of course, the mandrel 16 and rod 18 may be removed from the system for repair or replacement purposes as will be apparent to those skilled in the machinery arts.

Component Details

Referring now to FIG. 2, the tube descrambler/loader 22 is shown to comprise a base 90 the upper surface of which defines a ramp 92 capable of accommodating a series of parallel, adjacent tubes 94. After being rolled onto the ramp 92, the tubes 94 are held in a ready position by means of a mechanical stop 96. Tubes 94 are placed on the ramp by means of a parallel belt type sling 98 which is large enough to hold a substantial supply of tubes 94. The belts of the sling 98 are connected to powered spools 100 which can be rotated in the clockwise direction to lift the sling upwardly in feed tubes 94 onto the ramp 92.

When the controller 24 of FIG. 1 is ready for a tube 94 to be fed onto the tube feed path 20, a signal is generated by the controller activating a cylinder 102 on the loader 22 which pivots a lifter 104 to raise the end tube 94 over the stop 96 and onto a series of spaced parallel drive rollers 106 on the front of the base 90. It will be appreciated that to accommodate 20 foot lengths of tube 94, the apparatus shown in end view in FIG. 2 is on the order of 20 feet long and, therefore, comprises a number of spaced parallel straps 98, spools 100, stops 96, lifters 104 and drive rollers 106. The loader 22 can be made as long as necessary to accommodate the range of tubular stock anticipated for use in the system. As set forth above, the descrambler/loader 22 is a prior art device. Similar loaders are available from the Teledyne Pines Company.

Figure 3:
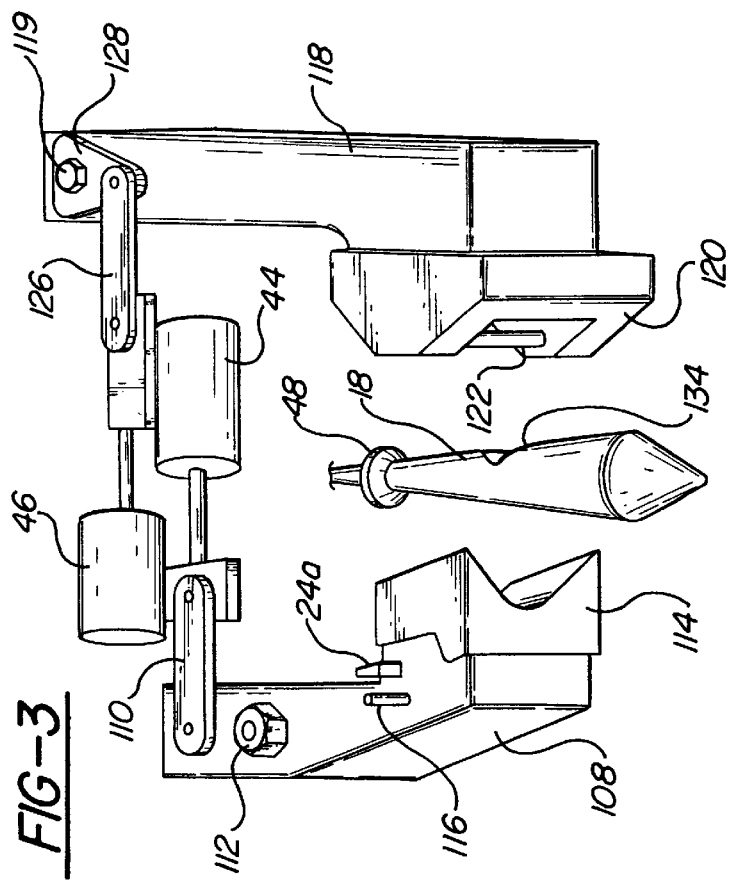
FIG. 3 is a detail of the mandrel lock apparatus of my invention.

Referring now to FIG. 3, details of the mandrel locks 40 and 42 will be described. FIG. 3 is particular to mandrel lock 40 as shown but, except for its position relative to the mandrel rod 18, is equally representative of the exit end mandrel lock 42.

The mandrel lock 40 comprises a first pivot arm 108 driven through link 110 around pivot point 112 by power cylinder 44; the "CLOSED" direction of cylinder 44 is to the left as shown in FIG. 3. Pivot arm 108 carries a replaceable anvil 114 which is configured to engage and hold the mandrel rod 18 in a cradling fashion. A stop 116 is formed on the arm 108 and comes into mechanical engagement with a fixed stop 24a which is part of the support base 24 shown in FIG. 1.

Continuing the description of the mandrel lock 40 as shown in FIG. 3, the second pivot arm 118 is located on the right side of the mandrel rod 18 as shown in FIG. 3 and comprises replaceable tooling 120 having a vertically oriented locator pin 122 opposite the anvil 114 and engageable in and with a shaped notch 124 in the mandrel rod 118. When properly adjusted for operation, the locator pin 122 fits into the notch 124 and holds the mandrel rod 118 firmly against the cradle surface of the anvil 114, thereby to prevent any longitudinal movement of the rod 18 relative to the shear plane 84 which is fixed relative to the support 24. The radius of the pin 122 is slightly greater than the depth radius of the notch 124 so a two-point contact is achieved.

Pivot arm 118 has a pivot point 119 and is connected to cylinder 46 through links 126 and 128. The "closed" direction of operation of cylinder 46 is again to the left. As will be apparent to those familiar with the operation of hydraulic power cylinders, cylinder 46 is a "pulling" cylinder whereas 44 is a "pushing" cylinder; therefore, cylinder 46, assuming the same hydraulic pressure and cylinder size, is the weaker of the cylinders 44 and 46. As previously described, cylinder 44 is operated first so that the anvil 114 is in place before the second cylinder 46 is activated to bring the locator pin 122 into position. Both cylinders 44 and 46 are operated to the right as shown in FIG. 3 to open the mandrel lock.

Referring now to FIG. 4, the detail of the main roller drive will be described in greater detail. The main drive 52 comprises left and right drive rollers 54a and 54b which can be closed and opened to grip and release the tube 94 as desired. Rollers 54a and 54b are mounted on rigid L-shaped links 130 and 132 having respective pivot points 134 and 136 relative to the support 24. Links 130 and 132 are connected by intermediate links 138 and 140 respectively to the output plunger 142 of an hydraulic actuator 144. Advancing the plunger 142 upwardly as shown in FIG. 4 closes the rollers 54 on the tube 94; vertically downward movement of the plunger 142 as shown in FIG. 4 opens the main drive to disengage the drive rollers 54 from the tube. The rollers themselves are connected to hydraulic drive motors 146 and 148, respectively, which rotate the rollers in opposite directions to drive the tube 94 toward the shear 10. The drive is preferably bidirectional. It will be understood by those skilled in the hydraulic control arts that solenoid controlled valves 150 and 152 are appropriately connected into the hydraulic control lines to the motors 146 and 148 to respond to signals from the controller 24.

Figure 5:
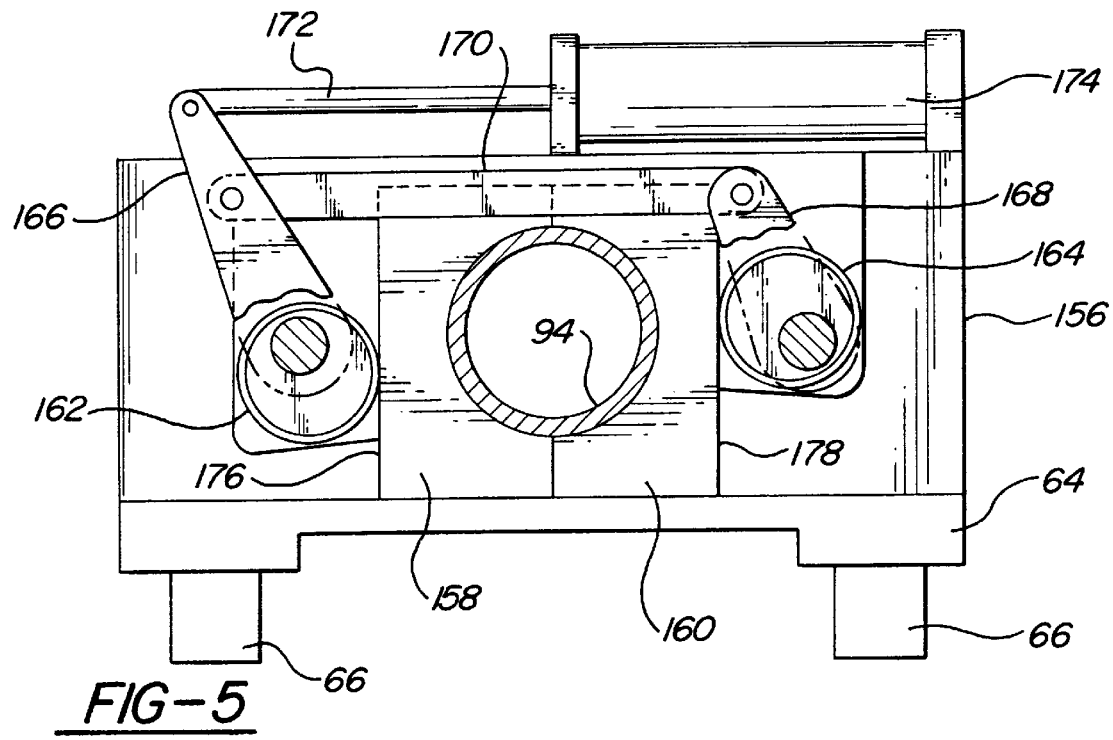
FIG. 5 illustrates the novel gripper apparatus which is employed in the automatic feed system of the present invention.

Referring now to FIG. 5, the details of the gripper portion of the precision feed mechanism 72 will be described. The gripper mechanism comprises a base carriage 64 mounted on slide rails 66 which are seated on the bed 50 which represents a mechanical ground. Mounted on carriage 64 is frame 156 of which the two pieces are complementally movable inwardly and outwardly and carry respective grippers 158 and 160, the internal surfaces of which are arcuately machined to conform to the outer diameter of the tube 94 as shown. Eccentric roller bearings 162 and 164 are pivotally connected to the frame 156 on opposite sides of the tube center line and spaced so as to engage the left and right vertical surfaces 176 and 178 of the grippers 158 and 160, respectively. The rollers 162 and 164 fit into pockets in the gripper carrier frame 156 so as to positively urge the grippers apart when rotated in the opposite direction. The two slidable parts of the frame 156 rest on the carriage 64 and are preferably maintained in proper alignment by way of a pair of guide pins (not shown). Again, refer to TMA-005 for details.

Eccentric roller 162 is connected to a link 166 whereas roller 164 is connected to a link 168. The two l inks 166 and 168 are tied together by means of a cross link 170 and the entire arrangement is connected to an output plunger 172 of nearest cylinder 174. The arrangement is configured such that the extension of the plunger 172 from right to left as shown in FIG. 5 closes the gripper inserts 158 and 160 to clamp the tube 94. Conversely, movement of the plunger 172 from left to right as shown in FIG. 5 positively opens the gripper inserts. No springs or other such devices are required. Rollers 162 and 164 operate in the manner of cams and have considerable mechanical advantage.

There are numerous advantages to the arrangement shown in FIG. 5. One of these advantages is the fact that use of a fluid cylinder provides a cushion that prevents damage to the apparatus of FIG. 5 in the event there is an obstruction which prevents closing of the gripper inserts 158 and 160 on the tube 94; i.e., air in the cylinder 174 simply compresses and the gripper inserts remain open to the degree necessary to accommodate the obstruction. Another advantage is that a single unidirectional stroke of the cylinder 174 drives the grippers 158 and 160 in opposite directions through the eccentric 162 and 164. The rollers are contoured to operate in opposite sense when rotated in the same direction; i.e., the larger radius of cam 162 measured from the pivot point is in approximately the 4 o'clock position whereas the larger radius of cam 164 is in the 10 o'clock position as shown in FIG. 5. Details of the shear 10 including the clamp 76 and the opposing seat 77 and the drive 78 are omitted from this description that may be found in the copending application, Attorney's Docket No. TMA-005, filed simultaneously with this application.

Figure 7:
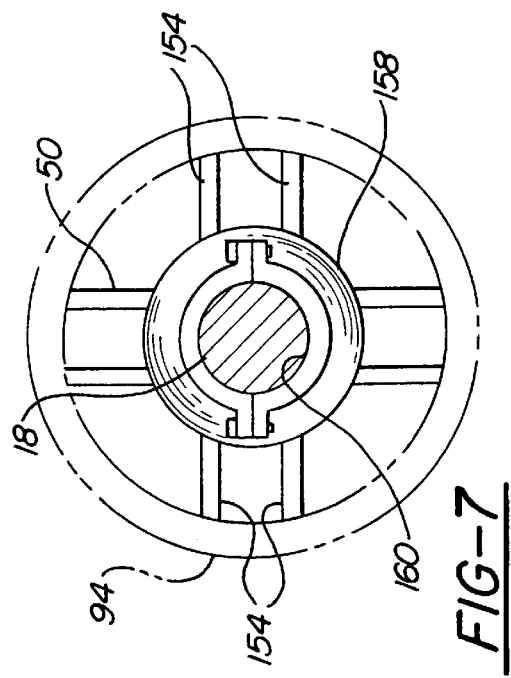
FIG. 7 is a sectional view of one of the forms of FIG. 6.
Figure 6:
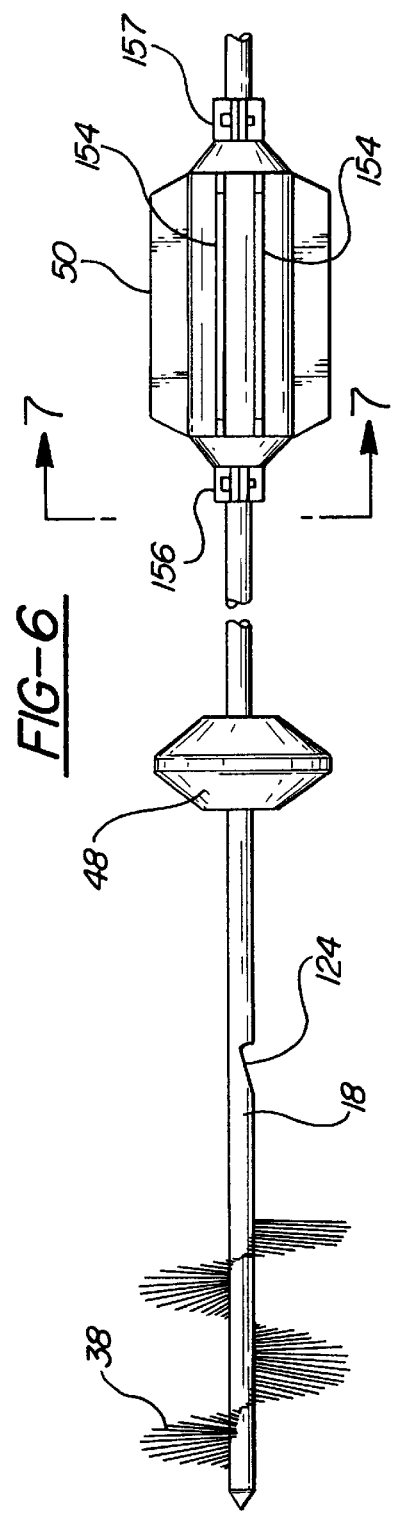
FIG. 6 is a detail of the mandrel support rod illustrating the forms and the internal tube cleaning brush which are mounted thereon.

Referring now to FIGS. 6 and 7, additional details of the mandrel rod 18 and the accessories 38, 48 and 50 mounted thereon are disclosed.

As previously described, the accessory 38 is a replaceable wire-bristle brush stationed adjacent the entry end of the mandrel rod 18 to clean out the interior of the tubes 94 which slide onto the mandrel rod. Form 48 is a shell-shaped steel object which reoccurs at approximately four foot intervals along the mandrel rod 18. Its outer diameter is slightly less than the inner diameter of the tube 94 and tends to stabilize the mandrel rod 18 relative to the tube centerline. Form 50 is shown in both FIGS. 6 and 7 to comprise a cylindrical body 158 approximately six inches in length to which four sets of two parallel plates 154 form an object the effective outer diameter of which closely corresponds with the inner diameter of the tube 94 to be processed. Form 50 is adjustably movable along the mandrel rod 18 by means of split collars 156 and 157 which can be tightened to clamp the form 50 onto the rod 18 or loosen to release the form and permit it to be moved to another position or removed from the rod 18 entirely. The inner diameter 160 of the cylinder 158 conforms closely to the mandrel rod 18 but permits relatively free sliding movement when the locking collars are released.

The form 50 is adjusted in position so that it coincides to the location along the mandrel rod 18 where the lead edge plane of a tube being advanced along the rod by the main drive 52 meets and abuts the tail stock trailing edge plane of the previous tube in the sequence. It has been found that a long form such as 50 is needed to stabilize and ensure concentricity of the abutting tubes, particularly where the end planes are not perfectly parallel and/or burrs or jagged edges occur on the abutting surfaces.

Methods of Operation

Method No. 1

As a first example, it will be assumed that a 20 foot length of tubular stock is fed into the system by the operation of the loader 22, is picked up by the photocell 26 and advanced by the in-feed drive 30, 32, 34. The tubular stock is fed over the brush 38 and onto the mandrel rod 18. Controller 24 is advised by photocell 26 of the advance of the tubular stock and sets the mandrel locks 40 and 42 such that mandrel lock 40 is "OPEN" and mandrel lock 42 is "CLOSED"; in this instance the term "OPEN" means that the lock is released from the rod 18 to permit the passage of the tube. There being no prior length of tubing in the system, in-feed drive 30, 32, 34 continues in operation until the 20 foot length of tube reaches the main drive 52, an event which is signaled by the limit switch 56 sending a signal to the controller 24. The controller 24 outputs a command closing the rollers 54 and setting the main drive for high speed operation which is timed to bring the lead end to the switch 58 as previously described. Then a low speed operation advances the tube lead end to lock 42.

Three additional conditioning steps are carried out: first, the mandrel lock 42 is closed; second, the carriage 64 is advanced to the most forward position; i.e., to the position of its travel closest to the shear 10 and, third, the shear 10 is incrementally operated by the drive 78 to offset the insert 14 relative to the insert 12. This latter condition is known as "closing" the shear in the sense that it creates a mechanical obstruction to the passage of the tubular stock all the way through the shear 10. However, it also provides a position reference by permitting the lead end of the tubular stock to be brought into contact with the obstructing forward wall of the insert 14 such that the lead end of the tubular stock is precisely located at the shear plane. This is the "zero" reference position and all subsequent and cumulative forward movement of the precision feed 72 and the carriage 64 relative to the fixed rails 66 will be measured from this zero reference position. Lock 42 is opened when the trailing end clears switch 41. Lock 40 is then closed. The tube is advanced to switch 70.

Passage of the trailing tube end by switch 43 tells the controller 24 that it is time to close the mandrel lock 42 and open the mandrel lock 40 to permit the next tube to be loaded.

The contact of the first advancing tube with the limit switch 70 indicates to the controller 24 that it is time to dramatically reduce the speed of advance of the tubular stock as it is about to encounter, in this case, the closed shear tooling at the zero reference position. Again, the rough position of the lead end of the tube is calculated as a function of time, any error in actual position being accommodated by the fact that some slip is permitted between the rollers 54 and the outer surface of the tubular stock.

The step of advancing the carriage 54 to the forwardmost position has the advantage of placing the limit switch 70 at a position which is the farthest downstream permitted by the mechanical design of the system and thus, the most efficient in terms of establishing the time at which the controller switches from high speed advance to low speed advance conditions. After establishing the position reference, the precision feed 72 takes over by (a) activating the hydraulic clamp 76 to clamp the tube in position and (b) retracting the carriage 64 to the left most position as shown in FIG. 1 with the precision feed rollers in the open condition; i.e., the tube is maintained in the "home" position wherein the lead end of the tubular stock abuts the insert 14 at the shear plane 84. When fully retracted, the precision feed rollers (shown in FIG. 4) are closed and the hydraulic clamp is released. The carriage 64 is then advanced in one of two ways. The first option is to remove a length of stock from the lead end of the tube which is calculated as the desired or necessary scrap which is inherently to be produced in this length of tubular stock as a result of a mathematical mismatch between the number of desired lengths to be produced and the original length of the tube. The second alternative is to create the scrap, if there is to be any scrap, at some other point in the tubular stock and simply advance the tube a distance equal to the desired length of the first cut. Of course, if the first length is greater than the maximum travel of the feed 72, it travels full stroke, reverses and advances again until the total cumulative forward movement equals the desired tube cut length. If the cut length is shorter than the max travel length, the feed 72 advances incrementally without intervening reversals. Each cut length is selectable by the operator via the controller 24 or, alternatively and more typically, all of the cut lengths (except the scrap length) are selected to be the same in which case each incremental advance of the carriage 64 is made over the same distance.

It will be assumed for purposes of describing the next method of operation that the desired length of the last element of the original tubular stock is such that the precision feed mechanism 64, 70, 72 cannot advance it completely through shear 10. Thus, there remains an uncut length of tube, herein called "tail stock," in the shear which the precision feed mechanism cannot advance.

Method No. 2

The method to be hereinafter described assumes, as stated above, that there remains an uncut length of tubular stock in the shear 10 which cannot be advanced by the precision feed mechanism 72. The function of this method is to push the last length of uncut tubular stock through the shear 10 using the next length of tube to be cut. Further cuts may be made during this process.

This is achieved in part in exactly the same fashion as is described with reference to the foregoing method; i.e., the loader 22 is operated as described above to feed a tube through the area scanned by the photocell 26; the mandrel lock 40 is opened and the mandrel lock 42 is closed. Alternatively and preferably, the second length of tubing is "staged"; i.e., brought into position between the locks 40, 42 or all the way up to the limit switch 70 while the previous length is in the incremental feed. This pre-staging of tubes saves overall production time and makes the system more efficient.

This time the controller 24 has retained the fact that there remains an uncut length of tubing in the shear 10 and it is a simple matter of subtraction to determine at least approximately where the tail end of the uncut length lies. The length of the form 50 is such that the tail end will virtually always overlie the form 50. The subsequent length of tubing is advanced by the high speed operation of drive 52 until it reaches the limit switch 70. Advance is thereafter made at a low rate for a set time. The grippers of the precision feed 72 are then clamped to the tube and the carriage drive 68 is then activated to urge the second length of tubing through the shear to push the uncut tail stock of the previous tube through the shear for additional cuts as required and, ultimately, to push the tail stock through the shear. The carriage 64 is then reversed and the rollers are opened to release the tube. The shear is thereafter closed to reestablish the home or zero reference position and the tubing is advanced by operation of the main drive roller until it reaches the zero position. The sequence described above then takes place for subsequent precision cuts of the second tube into desired lengths.

Method No. 3

This method is essentially the same as method No. 2 described above with one exception: the second tube is reverse fed after it has cleared the tail stock and is position referenced by closing the shear and bringing the lead end up to the closed shear tooling. Accordingly, the precision feed locks onto the second length of tube after it has been brought into abutment with the first length with the hydraulic clamp 76 holding the first length in its proper position. It is unnecessary to "zero" the position of the second tube; i.e., the precision feed 72 is operated by the controller 24 and the carriage drive 68 as if it were a continuation of the first tube until the accumulated travel of the first tube relative to its home position is such that the controller calculates that the entire 20 foot length has gone through the shear plane. At this point no further shearing operations take place; rather, the second or subsequent length which has been used as a "pusher" tube is carried back in the reverse direction and released so that it may be position referenced by drive 52 in the manner described above.

It can be seen from all of the foregoing described methods of operation that there are two indispensable interplays or relationships which must exist at all times. The first of these is that one or both of the mandrel locks 40, 42 must be closed to maintain the longitudinal position of the internal tooling 16 relative to the shear plane 84 at all times. Accordingly, the spatial locations of the components of the system relative to the length of uncut tubular stock must be such that the tubular stock can be engaged by the main drive 52 in one condition with mandrel lock 40 open and mandrel lock 42 closed and in the subsequent position with mandrel 40 closed and mandrel lock 42 open. The distance between locks 40 and 42 must be greater than the length of tube stock.

The second interplay is that which occurs between the precision feed 72 and the hydraulic clamp 76; i.e., once a length of tube being severed to length is position referenced, one or the other of these two mechanisms must be in control of the tube and its position at all times. If the tube is being advanced forward it is under the control of the precision feed 72 and the hydraulic lock 76 is open. If the precision feed 72 is being reversed then the hydraulic lock 76 must be closed to hold the tube against seat 77.

It is to be understood that the foregoing embodiments have been described for purposes of illustration and to conform to the patent laws in enabling a person of ordinary skill in the art to build and use an apparatus incorporating the various inventions as described hereinabove.

What is claimed is:

1. A method of shearing a succession of tubular workpieces into shorter lengths using a shearing apparatus having an in feed side and exit side, said apparatus including fixed and orbitally movable tooling defining a shear plane at the interface between said tooling, said apparatus further including a mandrel which is colocated with the shearing plane; said method comprising the steps of:

(a) incrementally feeding a first tubular workpiece on said mandrel through the tooling from the infeed side and shearing said first workpiece until the remaining uncut portion is of a scrap length;

(b) feeding a second, subsequent tubular workpiece on said mandrel through the tooling to clear the scrap length into the exit side; thereafter (c) retracting the subsequent workpiece back through the tooling without shearing it and, thereafter (d) incrementally feeding the subsequent workpiece through the tooling and shearing said subsequent workpiece.

2. A method as defined in claim 1 wherein the shearing step is carried out by displacing the movable tooling through an elliptical path.

3. A method of shearing a successor of elongate tubular workpieces into shorter lengths using a shearing apparatus having first and second serially adjacent tools defining a shear plane; said tools having apertures formed therein to receive and conform to the workpieces and wherein one of said tools is displaceable laterally between a first position in which the apertures are aligned to provide a continuous path from workpieces through the shear plane and a second position in which the apertures are non-aligned to effectively close the shear plane to the passage of workpieces as well as to shear a workpiece having portions on both sides of the shear plane, said method comprising the steps of:

(a) placing said one tool in the second position;

(b) advancing a first tubular workpiece on a mandrel until the lead end is co-located with the shear plane;

(c) placing said one tool in the first position;

(d) incrementally advancing the first workpiece through the shear apparatus and shearing same until the remaining portion on the entry side of the shear plane is of a scrap length;

(e) advancing a second tubular workpiece on said mandrel through the shear plane to clear the remaining portion into the exit side;

(f) retracting the second workpiece;

(g) placing said one tool in the second position;

(h) advancing the second workpiece until the lead end is co-located with the shear plane and (i) repeating steps (c) and (d) for said second workpiece.

4. A method of shearing a succession of elongate tubular workpieces in the shorter lengths using a shearing apparatus having first and second serially adjacent tools defining a shear plane wherein each of said tools have apertures formed therein to receive and conform to the workpieces and wherein one of said tools is displaceable laterally between aligned and non-aligned positions to provide a continuous and discontinuous path, respectively, through the shear plane and wherein said apparatus further comprises a feed mechanism located upstream of the shear plane along a workpiece path of travel by at least a minimum distance, said method comprising the steps of:

(a) using the feed apparatus to feed an initial tubular workpiece on a mandrel to the shear plane;

(b) using the feed mechanism to incrementally feed the initial workpiece through the shear plane and operating the apparatus to shear said workpiece after at least some of said incremental advances until the remaining portion of the workpiece is of a length which is less than said minimal distance;

(c) thereafter using the feed mechanism to advance a subsequent tube into abutment with the tail stock of the initial tubular workpiece on said mandrel;

(d) using the feed mechanism and the lead end of the subsequent tubular workpiece to incrementally feed the tail stock through the shear plane and operating the shear apparatus to cut the tail stock at least once; and, thereafter, (e) retracting the subsequent workpiece and incrementally feeding the subsequent tubular workpiece through the shear plane and cutting it into shorter lengths.

5. A method of shearing a series of at least two tubular workpieces into selected lengths using a shearing apparatus having an infeed side and an exit side, which defines a shear plane and includes a mandrel internally of the workpieces in the shearing plane and supported by a rod extending from the mandrel toward the infeed side comprising the steps of:

(a) advancing a first workpiece from the infeed side over the rod and onto the mandrel and to the shearing plane;

(b) advancing the first workpiece incrementally through the shear apparatus into the exit side;

(c) shearing the workpiece after at least some incremental advances until the remaining uncut portion of the workpiece on the rod is at or below a predetermined length; and, thereafter (d) advancing a second workpiece over the rod and into abutting relationship with the remaining uncut portion of the first workpiece; and (e) further advancing the second workpiece until the first workpiece is clear of the shear apparatus and said rod; and, thereafter (f) retracting the second workpiece such that the lead end is at the shearing plane;

(g) incrementally feeding the second workpiece through the shear; and (h) shearing the second workpiece.

6. The method as defined in claim 5 wherein step (b) is carried out using a second drive mechanism which includes means for gripping the tube and is reversely operable for incrementally advancing tube toward the shear and retracting tube from the shear.

7. A method of shearing tubular workpieces into one or more shorter lengths using a shearing apparatus having an infeed side and an exit side, said apparatus defining a shear plane between said sides and including a mandrel internally of the workpiece and co-located with the shearing plane, which mandrel is supported by a member disposed on the infeed side of the shearing plane comprising the steps of:

(a) advancing a workpiece from the infeed side over the member and onto the mandrel until the lead end thereof is co-located with the shearing plane;

(b) advancing said workpiece incrementally through the shearing plane and into the exit side of the shearing apparatus;

(c) shearing the workpiece after at least some incremental advances until the remaining uncut portion of the workpiece is of a scrap length;

(d) advancing a subsequent workpiece over the member and onto the mandrel and through the shearing plane until the scrap length has been cleared from the mandrel and support member; and, thereafter, (e) retracting the subsequent workpiece such that the lead end is colocated with the shearing plane.

* * * * *